US012664500B2

(12) United States Patent     (10) Patent No.:    US 12,664,500 B2

Reineke et al.            (45) Date of Patent:     *Jun. 23, 2026

(54) SYSTEM AND METHOD OF PROCESS PLACEMENT RECOMMENDATION BASED ON INFERRED SUSTAINABILITY ADVANTAGES FOR SUSTAINABLE ENERGY EFFICIENCY

(71) Applicant: Dell Products L.P., Round Rock, TX (US)

(72) Inventors: Nicole Reineke, Northborough, MA (US); Eloy Francisco Macha, Las Cruces, NM (US); Robert A. Lincourt, Franklin, MA (US); David Frattura, Stamford, CT (US)

(73) Assignee: Dell Products L.P., Round Rock, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/663,381

(22) Filed: May 13, 2022

(65) Prior Publication Data

US 2023/0368107 A1     Nov. 16, 2023

(51) Int. Cl.
    *G06Q 10/0635*      (2023.01)
(52) U.S. Cl.
    CPC ................................ *G06Q 10/0635* (2013.01)
(58) Field of Classification Search
    None
    See application file for complete search history.

(56) References Cited

U.S. PATENT DOCUMENTS

| | | | |
|---|---|---|---|
| 5,966,538 | A | 10/1999 | Granston et al. |
| 6,321,983 | B1 | 11/2001 | Katayanagi et al. |
| 7,617,133 | B1 | 11/2009 | Antony et al. |
| 8,447,569 | B1 | 5/2013 | Marwah et al. |
| 9,191,217 | B2 | 11/2015 | Martell |

(Continued)

FOREIGN PATENT DOCUMENTS

| | | |
|---|---|---|
| CA | 2926097 A1 | 4/2010 |
| EP | 0977137 A2 | 2/2000 |

(Continued)

OTHER PUBLICATIONS

M. Conti and S. Orcioni, "Cloud-based sustainable management of electrical and electronic equipment from production to end-of-life , "The International Journal of Quality & Reliability Management, vol. 36, (1 ), pp. 98-119, 2019. DOI: http://dx.doi.org/10.1108/IJQRM-02-2018-0055. (Year: 2019).

(Continued)

*Primary Examiner* — Mehmet Yesildag
(74) *Attorney, Agent, or Firm* — Workman Nydegger

(57)          ABSTRACT

Generating function placement recommendations and deploying functions in a manner that accounts for sustainability concerns. Function placements decisions are made that account for sustainability values. When a resource request is received, sustainability values are identified. The resources needed to fulfill the resource request are identified based on the sustainability values and available resources. The identified resources are potential placements for deploying the functions. A specific placement is selected, and the function is deployed to the corresponding resources.

20 Claims, 5 Drawing Sheets

(56) References Cited

U.S. PATENT DOCUMENTS

| | | | |
|---|---|---|---|
| 11,347,621 | B1 | 5/2022 | Alt et al. |
| 11,915,207 | B2 | 2/2024 | Files et al. |
| 2002/0030100 | A1 | 3/2002 | Katayanagi et al. |
| 2003/0163559 | A1 | 8/2003 | Dini |
| 2006/0015863 | A1 | 1/2006 | Vaidyanathan et al. |
| 2006/0236310 | A1 | 10/2006 | Domeika et al. |
| 2010/0088192 | A1 | 4/2010 | Bowles et al. |
| 2010/0153697 | A1 | 6/2010 | Ford et al. |
| 2010/0198671 | A1 | 8/2010 | Prabhakar et al. |
| 2010/0217631 | A1* | 8/2010 | Boss ................ G06Q 10/06375 |
| | | | 705/7.22 |
| 2010/0217715 | A1 | 8/2010 | Lipcon |
| 2010/0250298 | A1 | 9/2010 | Channabasavaiah et al. |
| 2011/0060616 | A1 | 3/2011 | Clark et al. |
| 2011/0087522 | A1 | 4/2011 | Beaty et al. |
| 2011/0225276 | A1 | 9/2011 | Hamilton et al. |
| 2013/0139132 | A1 | 5/2013 | Kass et al. |
| 2013/0167127 | A1 | 6/2013 | Gu et al. |
| 2013/0304925 | A1* | 11/2013 | Ferris .................. G06F 11/3006 |
| | | | 709/226 |
| 2014/0201218 | A1 | 7/2014 | Catalano et al. |
| 2015/0169306 | A1* | 6/2015 | Labocki ................ H04L 67/565 |
| | | | 717/176 |
| 2015/0358207 | A1 | 12/2015 | Baldock et al. |
| 2016/0085528 | A1 | 3/2016 | Kalogeropulos et al. |
| 2017/0008671 | A1 | 1/2017 | Whitman et al. |
| 2017/0031666 | A1* | 2/2017 | Sathyanathan ......... G06F 8/447 |
| 2018/0295010 | A1 | 10/2018 | Grobe et al. |
| 2018/0343169 | A1 | 11/2018 | Stephens |
| 2019/0033945 | A1* | 1/2019 | Magcale ............. G06F 11/3452 |
| 2019/0056416 | A1 | 2/2019 | Rodoni |
| 2019/0347623 | A1 | 11/2019 | Bostick et al. |
| 2020/0143334 | A1 | 5/2020 | Kayara |
| 2020/0314145 | A1 | 10/2020 | Bolignano et al. |
| 2021/0049559 | A1 | 2/2021 | Kilburn |
| 2021/0081889 | A1 | 3/2021 | Whitman et al. |
| 2021/0082022 | A1 | 3/2021 | Whitman et al. |
| 2021/0173710 | A1 | 6/2021 | Crossley et al. |
| 2021/0365900 | A1 | 11/2021 | Fedyski |
| 2022/0414558 | A1 | 12/2022 | Reineke et al. |
| 2022/0414562 | A1 | 12/2022 | Reineke et al. |
| 2022/0414563 | A1 | 12/2022 | Reineke et al. |
| 2022/0414575 | A1 | 12/2022 | Reineke et al. |
| 2022/0414576 | A1 | 12/2022 | Reineke et al. |
| 2023/0138727 | A1* | 5/2023 | Wong ............... G06Q 10/06375 |
| | | | 705/7.37 |
| 2023/0176641 | A1* | 6/2023 | Magcale ............. G06F 11/3062 |
| | | | 713/320 |
| 2023/0229409 | A1 | 7/2023 | Reineke et al. |
| 2023/0230051 | A1 | 7/2023 | Reineke et al. |
| 2023/0236812 | A1 | 7/2023 | Reineke et al. |
| 2024/0095689 | A1 | 3/2024 | Alon |

FOREIGN PATENT DOCUMENTS

| | | | |
|---|---|---|---|
| EP | 3388983 | A1 | 10/2018 |
| WO | 2016/112099 | A1 | 7/2016 |
| WO | 2017/007913 | A1 | 1/2017 |
| WO | 2021/070182 | A1 | 4/2021 |

OTHER PUBLICATIONS

M. McClellan and K. Harrison-Broninski, "Product meets process: product lifecycle management apps can help you gain control over disjointed activities, but globalization and emerging compliance requirements beg for a more process-oriented approach," Intelligent Enterprise, vol. 9, (2), pp. 37(5), 2006 (Year: 2006).

* cited by examiner

SYSTEM AND METHOD OF PROCESS PLACEMENT RECOMMENDATION BASED ON INFERRED SUSTAINABILITY ADVANTAGES FOR SUSTAINABLE ENERGY EFFICIENCY

RELATED APPLICATIONS

This application is related to U.S. Ser. No. 17/648,512 filed Jan. 20, 2022, Ser. No. 17/648,561 filed Jan. 21, 2022, and Ser. No. 17/648,486 filed Jan. 20, 2022, which applications are incorporated by reference in their entirety.

FIELD OF THE INVENTION

Embodiments of the present invention generally relate to function placements that are aligned with sustainability goals. More particularly, at least some embodiments of the invention relate to systems, hardware, software, computer-readable media, and methods for dynamically placing functions based on sustainability advantages.

BACKGROUND

Sustainability may be defined as the ability to meet present needs without compromising the ability to meet future needs. Sustainability has many elements including environmental components, social components, and economic components. When the individual goals of values of sustainability are considered, it is evident that some sustainability goals may contradict or compete with other sustainability goals. This is expected because the components of sustainability consider a wide range of policies.

Social sustainability goals, for example, may relate to education, community, equal opportunity, and opportunity. Environmental sustainability goals may relate to natural resource use and pollution prevention. Economic sustainability goals may relate to profits, cost savings, and research and development.

Many of these goals can be applied to compute environments. For example, in the context of computing, many users have heterogenous compute environments at their disposal. These compute environments may include core data centers, edge computing environment, and public clouds. When users are implementing sustainability goals, such as energy efficiency or carbon footprint awareness, it is difficult to determine the optimum location to run a function, at least from a sustainability perspective.

More specifically, data centers, edge systems and client environments have varied physical operating environments, at least with respect to energy sources, different service level agreements, different service level objectives, and the like. It is difficult to state, with certainty, what the energy consumption of a specific process will be. Each process may not behave as intended due to region specific considerations such as datasets, workflows, interactions within the environment, or the like. Users cannot provide an energy consumption metric for each process in each environment due to these uncertainties and unknowns. Processes may not consume the same amount of energy or be associated the same amount of carbon generation when executed in different computational environments. A user may have many systems with different capabilities that may impact meeting sustainability goals. Further, the sustainability goals for different systems or sites may be different. Nonetheless, the ability to identify the optimal environment for executing a function may improve the ability to meet sustainability goals.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to sustainability. More particularly, at least some embodiments of the invention relate to systems, hardware, software, computer-readable media, and methods for dynamically placing functions to align with sustainability goals and practices. Embodiments of the invention relate to placing functions in a manner that accounts for sustainability goals across various resources and across divergent computing systems and environments.

As used herein, functions include, but are not limited to, processes, workloads, algorithms, distributed processes, code, binaries, executables, containers or the like or combinations thereof. Placement, as used herein, refers at least to the process of determining the location (e.g., geographic), environment (e.g., datacenter, edge system, local device or network), system (e.g., operating systems, datasets, APIs, libraries), or the like in which to perform or execute a function. When a request is received to perform a function, embodiments of the invention may recommend a placement for the function that aligns with sustainability goals and values.

Embodiments of the invention relate, generally, to sustainability operations. Sustainability operations include operations that account for sustainability values. Sustainability operations include recommending function placement.

Sustainability values can be organized in many different ways. Examples of sustainability values are set forth, by way of example and not limitation, in Appendix A, which is incorporated by reference in its entirety.

Embodiments of the invention may be integrated with existing systems. For example, placing a function may be integrated into continuous integration/continuous deployment pipelines. Further, these pipelines may include other components or modules that also operate in a manner that accounts for sustainability goals. For example, compiling the function may be performed in a sustainable manner. Existing functions may be recompiled and/or placed a second time in a manner that accounts for sustainability. Placing functions may also be performed in the context of electronic waste or by accounting for natural resource consumption in a sustainable manner.

Sustainability goals can be impacted at least by function placement and/or infrastructure. Embodiments of the invention incorporate sustainability goals and policies, using sustainability values, when placing functions such that the functions are better aligned with the sustainability goals and with awareness regarding the system or infrastructure in which the functions are executed.

Figure 1:
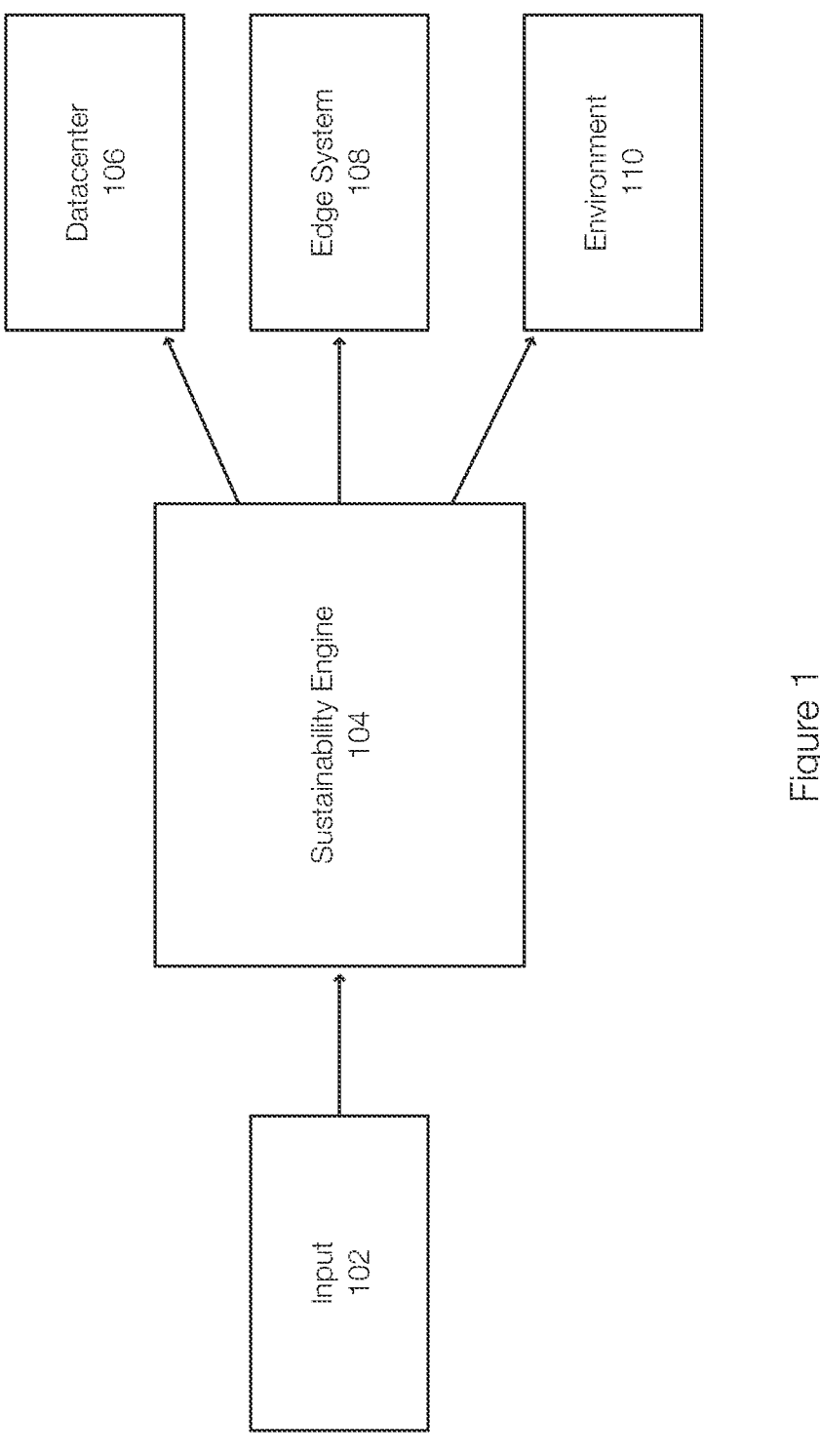
FIG. 1 discloses aspects of a sustainability engine configured to place a function in a computing environment.

In one example, a sustainability engine can analyze and match functions to sustainable values. Once the functions are identified, the sustainability engine may identify the systems or environments in which the functions can be placed. The sustainability engine may then perform, for example, a best-fit match between the functions and the available systems. The placement and operation of the functions may be tracked, and telemetry readings may be captured for auditing purposes and to improve the performance thereof going forward FIG. 1 discloses aspects of a sustainability recommendation engine. The sustainability recommendation engine or sustainability engine 104 is configured to receive input 102. The input 102 may have different forms. For example, the input 102 may be a user request to perform a function, instantiate an application, compile code, start an online meeting, record an online video, or the like. In each example, the request may require one or more functions to be executed. The sustainability engine 104 can identify the functions and recommend a placement for each of the functions. Thus, in this case, the sustainability engine 104 may be configured to determine a placement for the function associated with or identified in the input 102. The placement may include, by way of example, a datacenter 106, an edge system 108, or other computing environment 110. Because a workload may include multiple components or modules or functions, some of the functions may be placed into different locations or environments.

Alternatively, the input 102 may be a function and the sustainability engine 104 may evaluate the function to determine or recommend a placement. This may include analyzing the code, libraries, data sets that may be used by the function, reviewing an entity's sustainability values, or the like or combination thereof.

Once the sustainability engine 104 recommends a placement (or a list of placements), the sustainability engine 104 may rank the placements, determine the feasibility of the placements of the like. This allows a best match or an available placement to be identified and allocated such that placement of the function may be performed.

The sustainability engine 104 may consider multiple factors or characteristics when recommending function placement. The sustainability engine 104 may use measurable sustainability values, analyze energy efficient specific sustainable outcomes, analyze the systems actually available to perform the function, and consider the energy efficient sustainable targets.

The performance of the functions may be monitored against specific hardware types and the length of the run may be used as an indication of power consumption.

The resulting recommendations and actual placements are tracked. When deployed, telemetry readings are captured in a historian for auditing and subsequent optimization.

Sustainability-based placement decisions, in accordance with embodiments of the invention, are distinct from placement decisions that may be based primarily on cost. Embodiments of the invention, however, may also incorporate costs such as execution costs, data storage costs and data movement costs.

For example, the input 102 may be a request to launch an application such as an online meeting application. The online meeting application is an example of a function that may include multiple sub-functions or processes (also viewed as functions). For example, the online meeting application may include a chat process, a recording process, a video process, an audio process, or the like. There may be other applications that are available from within the online meeting application. For example, document processing and calendaring may be accessed or launched from within the online meeting application.

Some of these functions may be sensitive to latency. When the sustainability engine 104 recommends placements for these functions, the placement recommendations may consider at least the latency concerns and the sustainability goals. In one example, the audio and video processes may be co-located or placed near to each other geographically (e.g., in the same cluster). This example demonstrates that specific functions or portions thereof may have to deal with conflicting sustainability values. Substantial latency, for example, may discourage people from using the product and thus be unsustainable from an economic perspective. In another example, the placement of a recording process may depend on geography and/or relevant regulations and laws.

In summary, receiving a request to launch function may result in the placement of multiple processes in multiple locations.

Figure 2:
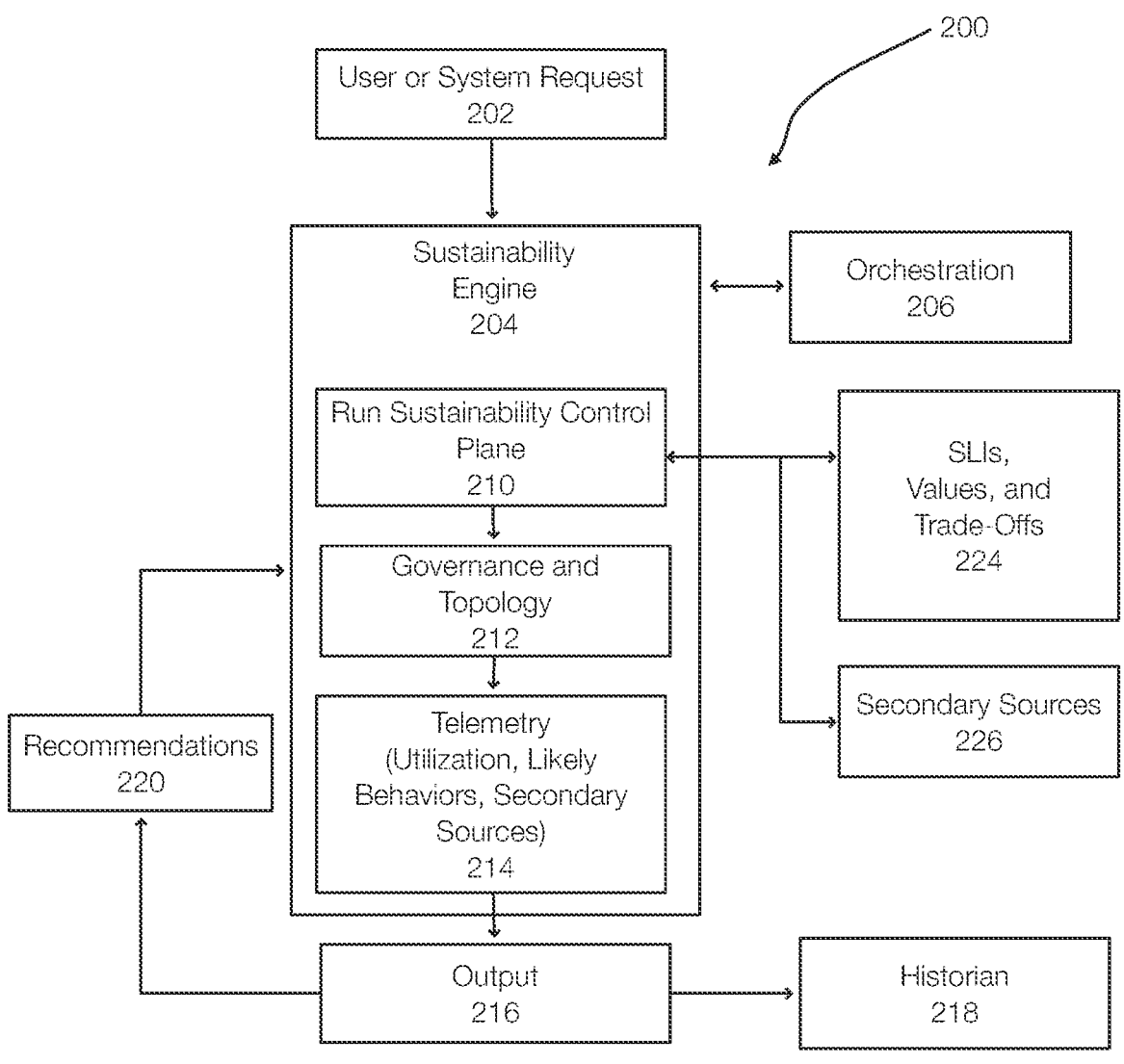
FIG. 2 discloses aspects of a method for generating function placement recommendations that are aligned with sustainability.

FIG. 2 discloses aspects of sustainability operations. The method 200 may begin when a user or system request is received 202. The request many include a request for resources such as a function. The request may include a function. The request is received by or intercepted by a sustainability engine 204.

Once the request is identified by the sustainability engine 204 (engine 204), the engine 204 begins the process that generates placement recommendations that are sustainability based. In other words, the placement recommendations respect or accommodates at least some sustainability values. The sustainability control plane 210 may access one or more datastores 224 to obtain or compile information related to, by way of example only, sustainability service level indicators (SLIs), sustainability values, and any potential trade-offs.

The SLIs, for example, may have been selected by a service provider, vendor, organization, or individual. SLIs may specify measurable behaviors, goals, or results and may include the locations at which to obtain data as well as the calculations and/or other details.

The sustainability values may be goals that are selected and/or prioritized by a service provider, vendor, organization, or individual. The sustainability values may map to one or more SLIs. For example, power consumption or other values related to sustainability can be measured or calculated. This allows a power consumption goal to be compared to telemetry data reflecting specific power consumption measurements from specific computing systems.

Figure 3:
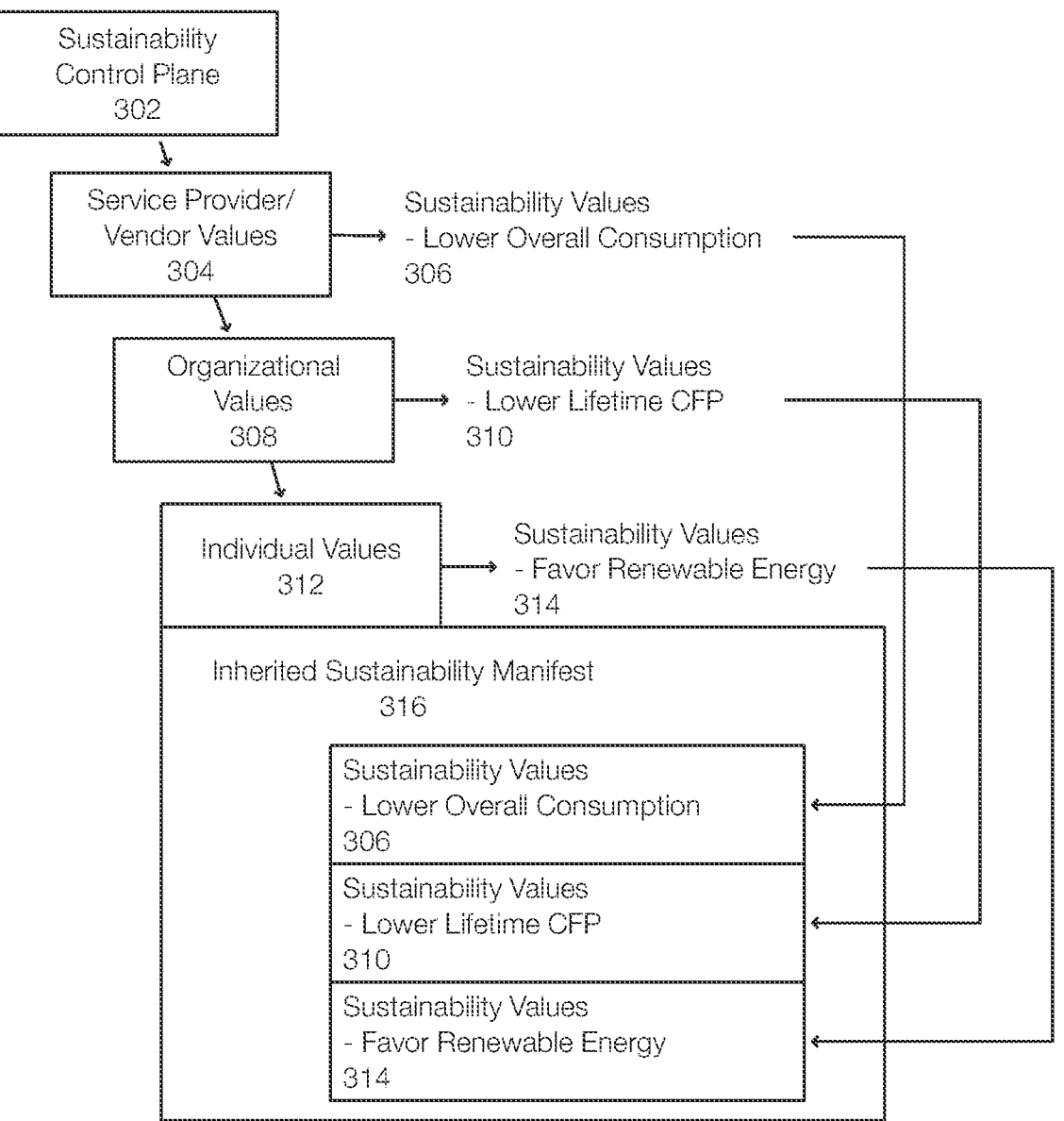
FIG. 3 discloses aspects of sustainability in placement methods.

More specifically, the sustainability control plane 210 may compare recommended or inherited sustainability values with sustainability SLIs. FIG. 3 illustrates an example of inherited sustainability values. In the sustainability control plane 302 (an example of the sustainability control plane 210), the service provider or vendor values 304 are associated with organizational values 308, which are associated with individual values 312.

One sustainability value of the service provider/vendor is to lower overall consumption 306. One sustainability value of the organization is to lower the lifetime carbon footprint (CFP) 310. An individual sustainability value in this example is to favor renewable energy 314. The inherited sustainability manifest 316, thus includes to lower overall consumption 306, lower lifetime CFP 310, and to favor renewable energy 314.

During the comparison or analysis, it may be necessary to perform a trade-off analysis to ensure that the results satisfy any minimum set of standards. For example, a government may set standards relative to, by way of example, calculations for adverse outcome, system conditions, resource flow, value creation, or the like. See https://www.epa.gov/sites/production/files/2014-10/documents/framework, which is incorporated by reference in its entirety for all purposes.

The sustainability value recommendations for a given request 202, which may be reflected in the sustainability values illustrated in FIG. 3 for example, can be evaluated in light of SLIs, values, and trade-offs 224, to generate an output request that is associated with resulting sustainability values.

Returning to FIG. 2, the control plane 210 may also consider secondary sources 226. The secondary sources 226, for example, allows the sustainability engine 204 to be aware of factors that may impact the operation of the function. Network outages, weather, movement of sources/destinations (e.g., a client using a function in a moving car), or the like may impact the placement and may impact a plan to transfer operation of the function from one location to another location.

Next governance and topology are performed 212. More specifically, the system may include a governance control plane and a topology plane. For example, a governance control plane may evaluate the resources that are accessible or available to the request or the user. Identifying locations that are available to a user or a request can impact the placement of the function. The sustainability engine 204 may not recommend placement for a location that is not available to a user (e.g., the user is not authorized or credentialed).

The topology plane may identify what exists in light of available resources. The topology plane may identify resources that are actually or practically available, which is distinct from resources that the user may have permission to use. For example, which datacenter is more suitable, is dark fiber available, what are the network configurations, what software or datasets are available, or the like. In this example, the topology may also impact placement. A function should not be placed in a location that does not have adequate topology.

Finally, telemetry 214 is performed and/or analyzed. Telemetry may evaluate the utilization, likely behaviors, and secondary sources. Telemetry may also consider any existing or historical telemetry data. The output of telemetry 214, from the input that came through the sustainability control plane 210 and governance and topology 212, may include a list of resources or assets that could be used for placing the function(s). More specifically, the output of the sustainability recommendation engine 204 is a set of recommended resources that may be used to meet the sustainability goals of a user or organization. The recommendations 220 may include placement recommendations for the function related to the request 202.

The sustainability engine 204 may select a specific recommendation and the selection is then executed by orchestration 206 to place the function or portions thereof in accordance with the selected recommendation.

The historian 222 may store information related to the calculations, decisions, inputs, telemetry and outputs, which may be used for audits, future calculations and analytics, or the like. The historian 222 may be consulted in current requests for placing a function.

Figure 4:
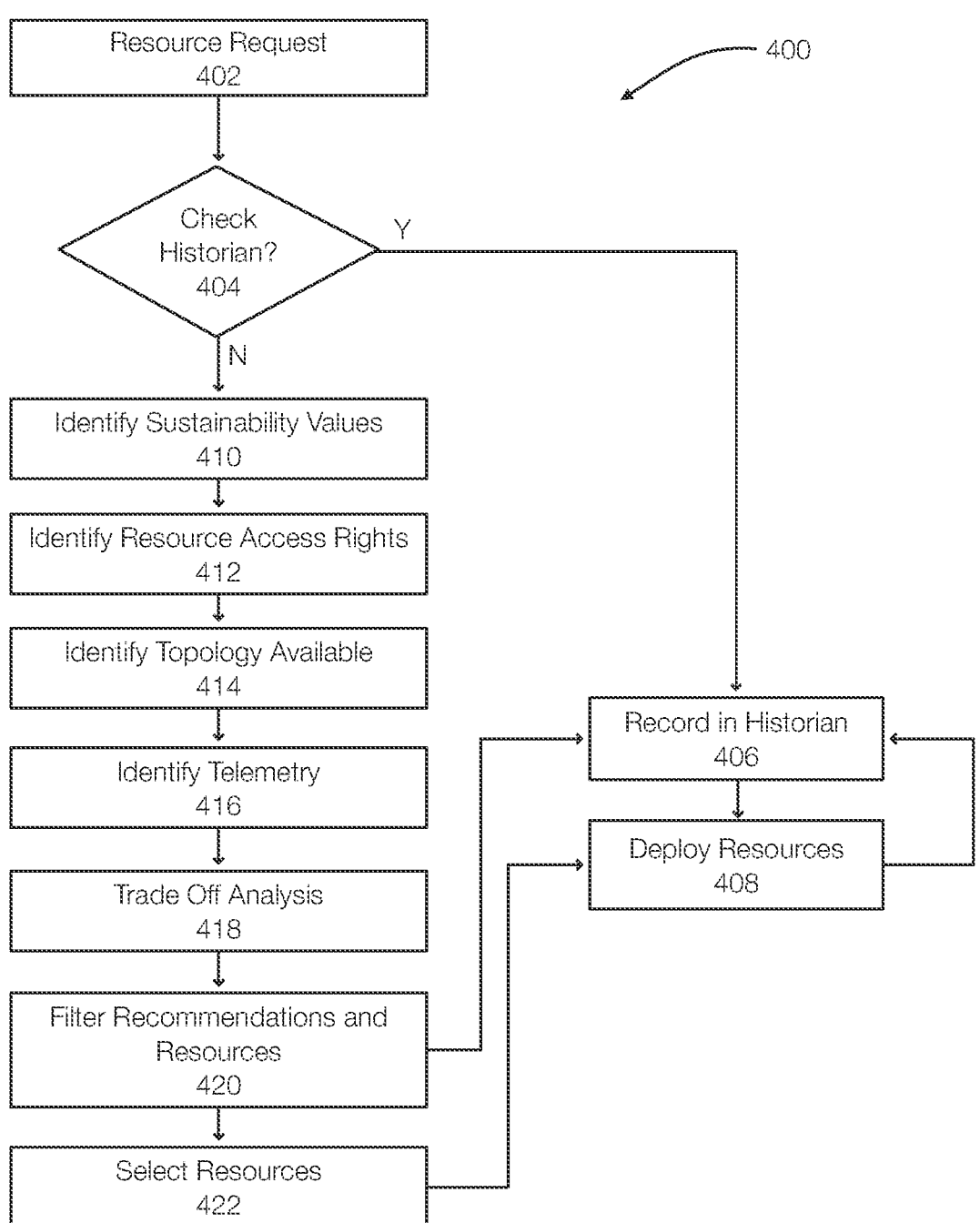
FIG. 4 discloses aspects of placing functions in a manner that considers sustainability values.

FIG. 4 discloses aspects of placing a function. In the method 400, a resource request 402 may be received. This may occur in the context of a function or a request to execute a function. When the request is received, the historian is checked 404 to see if the response (e.g., the placement recommendations) has been pre-calculated or previously performed for this request or this request type. If so (yes at 404), the new resource request is recorded 406 in the historian and the resources are deployed 408 in accordance with the historian 406.

If placement recommendations do not exist (N at 404) for the resource request 402, sustainability values are identified 410. The sustainability values may relate, by way of example and not limitation, to power consumption, carbon footprint, alternative energy, placement based on energy source, power consumption through up-to-date product refresh, predicted carbon footprint, manufacturing footprint, recycled material use, end of life impacts, or the like. These sustainability values may include inherited sustainability values as illustrated in FIG. 3.

Next, resource access rights are evaluated 412 (the control plane) and the topology is also identified 414 or evaluated (the topology plane). The access rights 412 allow the sustainability engine to identify what the user or requestor has access to and the topology identification 414 allows the sustainability engine to compare the access rights with the resources that are actually available.

Telemetry may be performed 416. Telemetry may evaluate the probable behavior and may identify which resources can meet the probable behavior. In this example, the metrics for the SLIs may be captured in order to evaluate the telemetry in the context of the sustainability values.

A trade-off analysis 418 may be performed. In one example, the potential placement recommendations may be scored and ranked. Next, using available resources and likely needs, which may be determined from the sustainability values 420, the resource access rights 412, the topology 414, and the telemetry 416, the recommendations, which identifies resources for the request, are filtered 420. Filtering allows the resource recommendations most aligned with the request and the inherited sustainability values to be identified.

The results of filtering are recorded in the historian 406. The results of filtering includes one or more placement recommendations for the resource. In one example, the selection of resources for placing the function is automated. In another example, a user may select placement for the function from the output of the filter. In other words, selecting 422 resources may be performed automatically or based on user input.

Once a placement is selected, the function may be deployed to the resources identified by the placement.

Resource directed decision making can support the sustainability goals of an organization. Embodiments of the invention may determine placement options that map to the recommended asset utilization for an organization. For example, this may take the form of library matching based on resource utilization and placement. In other example, certain functions may operate more efficiently or more sustainably in different environments.

The historian and/or feedback loops can measure the utilization of the resource once placed (e.g., the telemetry data generated from the function after placement). This further allows system behaviors to be confirmed or allows actual system behaviors to be realigned with sustainability priorities and/or goals.

For example, a user may use multiple cloud environments for machine learning workloads. In one workload, there is a need to run an image processing subroutine on a series of videos. A request may be received to place a function (e.g., the image processing subroutine).

The sustainability service or engine receives the request and checks to determine whether inherited sustainability values exist for this request type, the type of function, and/or the user. For example, the same image processing subroutine may have been previously deployed in accordance with sustainability values. If present, a placement recommendation is checked, and this placement may be optionally returned for approval or used for deployment.

If this is a new request or user, the sustainability engine may intercept the request and determine the inherited sustainability values. In this example, the inherited sustainability values may identify a vendor sustainability value of a desire to pursue low power consumption and an organization sustainability value related to a lifetime carbon footprint for the consumption of resources. Thus, if an organization buys new hardware, the organization is responsible for reporting on the full product carbon footprint from manufacturing to decommissioning. The inherited sustainability values may also include an individual sustainability value of using recycled resources when possible.

In one example, these individual sustainability values may be weighted. Further, in the event of a conflict, the more specific value may be given priority.

Next, the governance control plane determines access rights. This is matched against topology available to the requesting user. The workload needs are then matched against the known available resources. From the possible providers, an ordered list is created using the inherited sustainability values as the rules and the sustainability SLIs against each resource in the telemetry plane. The ordered list is returned, and the trade-off analysis is performed to ensure that the recommendations to not have any unintended negative adverse outcomes. A placement decision is performed.

Embodiments of the invention thus relate to systems and methods that enable the use of individualized, inherited sustainability values in orchestration recommendations that considers measurable service level indicators in the placement of functions across heterogeneous resources.

To meet target sustainability goals, the orchestration engine (e.g., orchestration 206) and/or the sustainability engine (e.g., the sustainability engine 204) may consider both target and measurable sustainability SLIs and SLOs. These may be determined through the capture of individualized and/or inherited sustainability values which exist across heterogeneous sets of resources. This enables the orchestration engine to make better placement choices in alignment with those SLIs based on measurements of how functions are executing in the platform.

In addition, the resource consumption of functions can be traced across sustainability values for use in future placement and orchestration recommendations. In order to make future placement recommendations, enabling the tracing of resource consumption of a function across sustainability metrics builds intelligence to the sustainability engine to further fine-tune and improve function placement decisions.

Next, the identification of changes in function behavior over time through records or value calculations may allow trends (positive or negative) in sustainability-related consumption to be identified for use in future decision-making operations. Capturing the behavior of functions over time enables future placement and orchestration decisions to be fine-tuned and improved. Through analysis of changes and positive/negative trends of sustainability-related consumption metrics, future function placement decisions will be improved in maintaining target sustainability SLIs/SLOs.

In a marketplace environment, via API or UI call, the ability to relay the information related to the function's sustainability consumption values for use in ordering recommendations on placement and resources selection can be achieved. Providing near real-time feedback through a marketplace on a function's sustainability consumption values, over specific heterogenous resources, will enhance the experience in future ordering recommendations on the placement of resources in support of the target functions.

Even when performing a tradeoff analysis with respect to multiple potential placements or environments in which a function may be deployed, environments that support the execution of target functions within the scope of target sustainability goals may be a primary recommendation.

Environments that support the execution of target function(s) but with limited support of subset(s) of sustainability goals may be secondary placement recommendations.

In addition, aggregate organizational goals can be met by evaluating or analyzing multiple functions operating across heterogenous resources. This allows recommendations to be made to support target sustainability goals such as low carbon footprint, point in time power consumption, and geo-placement decisions.

In general, embodiments of the invention may be implemented in connection with systems, software, and components, that individually and/or collectively implement, and/or cause the implementation of, sustainability operations. Sustainability operations including sustainability value analysis operations, compilation operations, and the like.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, containers or any combination of these, though no particular device implementation or configuration is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a resource request at a sustainability engine, identifying sustainability values for the resource request, identifying placements for the placing a function associated with the resource request, wherein each of the placements includes resources for performing the function, selecting a particular placement from the placements, and deploying the function to the resources associated with the particular placement.

Embodiment 2. The method of embodiment 1, wherein the sustainability values include inherited sustainability values including organizational sustainability values and individual sustainability values.

Embodiment 3. The method of embodiment 1 and/or 2, further comprising identifying resources accessible to the resource request based on a user.

Embodiment 4. The method of embodiment 1, 2, and/or 3, further comprising determining which of the resources are available to execute the function.

Embodiment 5. The method of embodiment 1, 2, 3, and/or 4, further comprising determining a telemetry of the available resources.

Embodiment 6. The method of embodiment 1, 2, 3, 4, and/or 5, further comprising generating the placements.

Embodiment 7. The method of embodiment 1, 2, 3, 4, 5, and/or 6, further comprising performing a tradeoff analysis on the placements.

Embodiment 8. The method of embodiment 1, 2, 3, 4, 5, 6, and/or 7, wherein the tradeoff analysis includes identifying placements that support the execution of the function and meet target sustainability goals as primary recommendations, wherein placements that support the execution of the function and meet a subset of the target sustainability goals are included as secondary recommendations.

Embodiment 9. The method of embodiment 1, 2, 3, 4, 5, 6, 7, and/or 8, wherein the sustainability values relate to one or more of carbon footprint, power consumption, and geo-placement.

Embodiment 10. The method of embodiment 1, 2, 3, 4, 5, 6, 7, 8, and/or 9, further comprising storing information related to the placements, the sustainability values, actual and telemetries of the particular placement in a historian, wherein the historian is configured for generating an audit trail that includes all actions, decisions, calculations, inputs, and outputs impacting the placement of the function.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
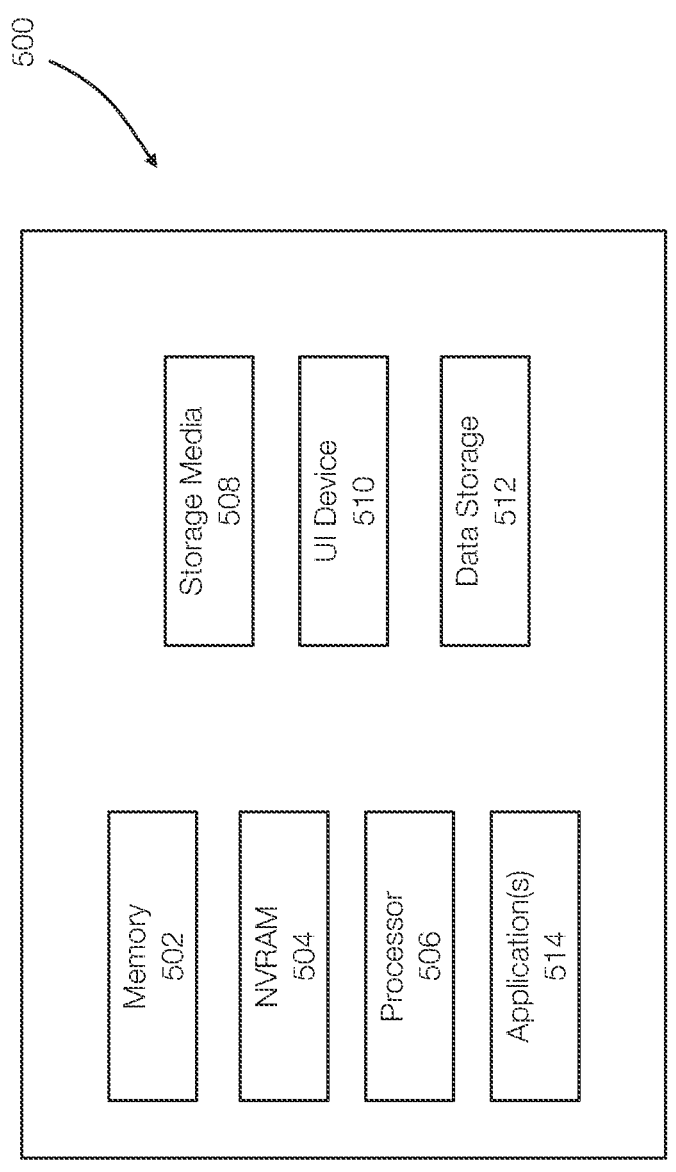
FIG. 5 discloses aspects of a computing device or a computing system.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 504 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for placing a function based on sustainability values and telemetry, the method being further configured to reduce latency of inter-process communications between an audio process and a video process of the function, wherein the audio process manages audio for an online meeting application and the video process manages video for the online meeting application such that the audio process and the video process are mutually dependent on one another, the method comprising:

receiving a resource request at a sustainability engine, the resource request having a type;

accessing a historian, the historian comprising a database and a processor, wherein the historian is configured to store information related to previous placements, sustainability values, and telemetries of the previous placements, to determine whether a previous placement for the type of the resource request has been performed;

wherein the historian is configured to improve placement operations of placing functions for resource requests over time as additional information related to placements are added to the historian such that at least some subsequent placements can be performed based on the information stored in the historian, wherein, when the previous placement is present in the historian for the type of the resource request, placing the function associated with the resource request according to the previous placement, where the function includes the audio process and the video process, which are mutually dependent on one another;

wherein, when the previous placement for the type is not present in the historian, identifying sustainability values for the resource request, wherein the sustainability values relate to carbon footprint, power consumption, and geo-placement, and wherein the sustainability values include inherited sustainability values including organizational sustainability values and individual sustainability values;

using a governance control plane to evaluate access rights of the resource requestor and to filter candidate resources that may be used to execute the function;

identifying placements for placing the function associated with the resource request based on an ability of the placements to provide computing resources and to fulfill the sustainability values, wherein each of the placements includes computing resources for performing the function, wherein the computing resources are selected to align with the sustainability values, and wherein the audio process and the video process of the function are both sensitive to latency relative to one another as a result of said mutual dependency, such that the identified placements for the function are required to account for potential latency that may exist between the inter-process communications that occur between the audio process and the video process;

determining telemetry and topology associated with the placements, wherein the telemetry includes metrics to determine whether the placements can satisfy a probable behavior of the function, wherein the topology identifies computing resources that are actually available at the placements, wherein determining the topology comprises using a topology control plane to detect availability in a heterogeneous computing environment including at least one of a datacenter, an edge system, or a cloud system, and wherein determining the telemetry comprises capturing at least one of CPU utilization, latency, or power draw metrics;

selecting a particular placement from the placements based on the telemetry, the topology and by performing a best fit match between a carbon footprint, a power consumption and a geo-placement of the particular placement to the sustainability values of the resource request, including performing a trade-off analysis that scores and ranks the placements against the sustainability values and telemetry metrics, wherein the particular placement that is selected is one that requires the audio process and the video process to be co-located in a same computing cluster so as to reduce or eliminate the potential latency that may exist between the inter-process communications of the audio process and the video process; and deploying the function to the computing resources associated with the particular placement, wherein the function is executed in the computing resources associated with the particular placement, and recording in the historian an audit trail comprising the placement, the telemetry metrics, and the inputs used for placement for use in improving subsequent placement decisions, wherein deploying the function including deploying the audio process and the video process onto the same computing cluster such that both the audio process and the video process execute on the same computing cluster, thereby reducing the potential latency that may exist between the inter-process communications of the audio process and the video process.

2. The method of claim 1, further comprising using secondary sources in selecting a particular placement, the secondary sources comprising information regarding network outages, weather, and/or movement of sources/destinations.

3. The method of claim 1, further comprising identifying resources accessible to the resource request based on a user.

4. The method of claim 3, further comprising determining which of the resources are available to execute the function.

5. The method of claim 4, further comprising determining a telemetry of the available resources.

6. The method of claim 5, further comprising generating the placements.

7. The method of claim 1, wherein the best fit analysis includes a tradeoff analysis, further comprising performing the tradeoff analysis on the placements.

8. The method of claim 7, wherein the tradeoff analysis includes identifying placements that support execution of the function and meet target sustainability goals as primary recommendations, wherein placements that support the execution of the function and meet a subset of the target sustainability goals are included as secondary recommendations.

9. The method of claim 8, wherein the sustainability values relate to power consumption, carbon footprint, alternative energy, placement based on energy source, power consumption through up-to-date product refresh, predicted carbon footprint, manufacturing footprint, recycled material use, and/or end of life impacts.

10. The method of claim 1, further comprising storing information related to the placements, the sustainability values, and telemetries of the particular placement in a historian, wherein the historian is configured for generating an audit trail that includes all actions, decisions, calculations, inputs, and outputs impacting the placement of the function.

11. A non-transitory storage medium having stored therein instructions that are executable by one or more hardware processors to perform operations for placing a function based on sustainability values and telemetry, the operations further reducing latency of inter-process communications between an audio process and a video process of a function, wherein the audio process manages audio for an online meeting application and the video process manages video for the online meeting application such that the audio process and the video process are mutually dependent on one another, the operations comprising:

receiving a resource request at a sustainability engine, the resource request having a type;

accessing a historian, the historian comprising a database and a processor, wherein the historian is configured to store information related to previous placements, sustainability values, and telemetries of the previous placements, to determine whether a previous placement for the type of the resource request has been performed;

wherein the historian is configured to improve placement operations of placing functions for resource requests over time as additional information related to placements are added to the historian such that at least some subsequent placements can be performed based on the information stored in the historian, wherein, when the previous placement is present in the historian for the type of the resource request, placing the function associated with the resource request according to the previous placement, where the function includes the audio process and the video process, which are mutually dependent on one another;

wherein, when the previous placement for the type is not present in the historian, identifying sustainability values for the resource request, wherein the sustainability values relate to carbon footprint, power consumption, and geo-placement, and wherein the sustainability values include inherited sustainability values including organizational sustainability values and individual sustainability values;

using a governance control plane to evaluate access rights of the resource requestor and to filter candidate resources that may be used to execute the function;

identifying placements for placing the function associated with the resource request based on an ability of the placements to provide computing resources and to fulfill the sustainability values, wherein each of the placements includes computing resources for performing the function, wherein the computing resources are selected to align with the sustainability values, and wherein the audio process and the video process of the function are both sensitive to latency relative to one another as a result of said mutual dependency, such that the identified placements for the function are required to account for potential latency that may exist between the inter-process communications that occur between the audio process and the video process;

determining telemetry and topology associated with the placements, wherein the telemetry includes metrics to determine whether the placements can satisfy a probable behavior of the function, wherein the topology identifies computing resources that are actually available at the placements, wherein determining the topology comprises using a topology control plane to detect availability in a heterogeneous computing environment including at least one of a datacenter, an edge system, or a cloud system, and wherein determining the telemetry comprises capturing at least one of CPU utilization, latency, or power draw metrics;

selecting a particular placement from the placements based on the telemetry, the topology and by performing a best fit match between a carbon footprint, a power consumption and a geo-placement of the particular placement to the sustainability values of the resource request, including performing a trade-off analysis that scores and ranks the placements against the sustainability values and telemetry metrics, wherein the particular placement that is selected is one that requires the audio process and the video process to be co-located in a same computing cluster so as to reduce or eliminate the potential latency that may exist between the inter-process communications of the audio process and the video process; and deploying the function to the computing resources associated with the particular placement, wherein the function is executed in the computing resources associated with the particular placement, and recording in the historian an audit trail comprising the placement, the telemetry metrics, and the inputs used for placement for use in improving subsequent placement decisions, wherein deploying the function including deploying the audio process and the video process onto the same computing cluster such that both the audio process and the video process execute on the same computing cluster, thereby reducing the potential latency that may exist between the inter-process communications of the audio process and the video process.

12. The non-transitory storage medium of claim 11, further comprising using secondary sources in selecting a particular placement, the secondary sources comprising information regarding network outages, weather, and/or movement of sources/destinations.

13. The non-transitory storage medium of claim 11, further comprising identifying resources accessible to the resource request based on a user.

14. The non-transitory storage medium of claim 13, further comprising determining which of the resources are available to execute the function.

15. The non-transitory storage medium of claim 14, further comprising determining a telemetry of the available resources.

16. The non-transitory storage medium of claim 15, further comprising generating the placements.

17. The non-transitory storage medium of claim 11, wherein the best fit analysis includes a tradeoff analysis, further comprising performing the tradeoff analysis on the placements.

18. The non-transitory storage medium of claim 17, wherein the tradeoff analysis includes identifying placements that support execution of the function and meet target sustainability goals as primary recommendations, wherein placements that support the execution of the function and meet a subset of the target sustainability goals are includes as secondary recommendations.

19. The non-transitory storage medium of claim 18, wherein the sustainability values relate to power consumption, carbon footprint, alternative energy, placement based on energy source, power consumption through up-to-date product refresh, predicted carbon footprint, manufacturing footprint, recycled material use, and/or end of life impacts.

20. The non-transitory storage medium of claim 11, further comprising storing information related to the placements, the sustainability values, and predicted telemetries of the particular placement in a historian, wherein the historian is configured for generating an audit trail that includes all actions, decisions, calculations, inputs, and outputs impacting the placement of the function.

\* \* \* \* \*